Nov. 2, 1937.  H. J. McC. BURDICK  2,097,548
AUTOMATIC HUMIDIFIER
Filed Sept. 3, 1935
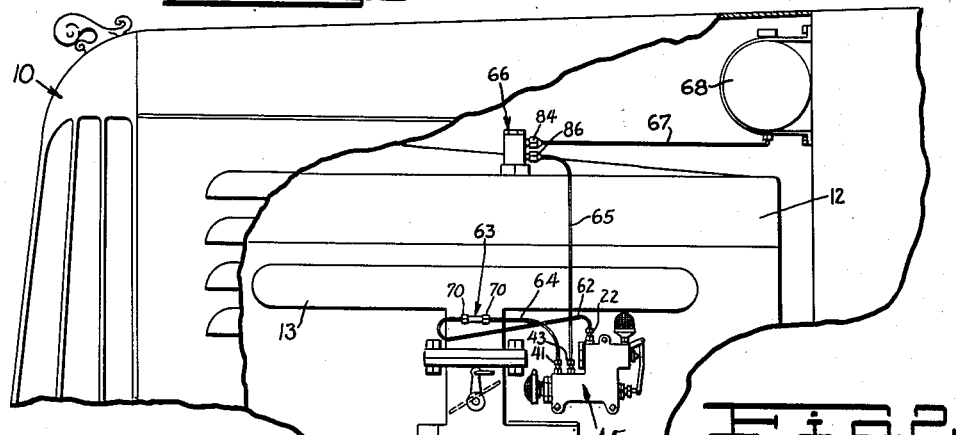
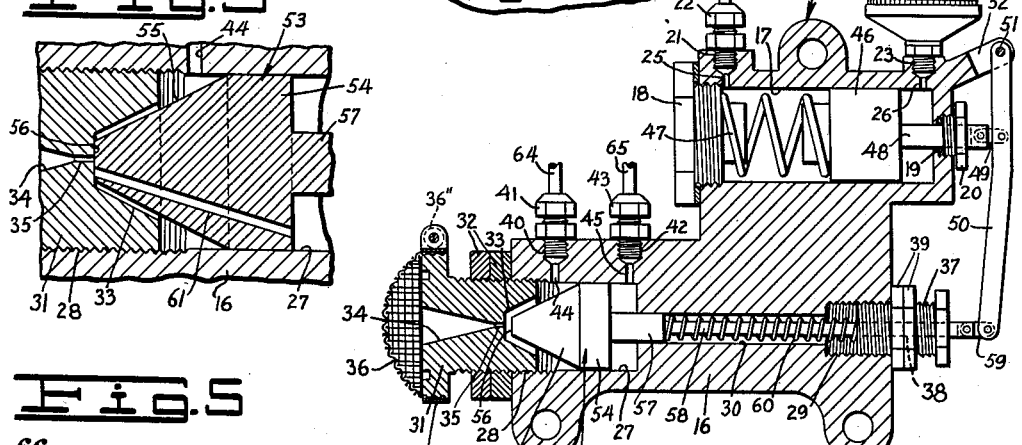
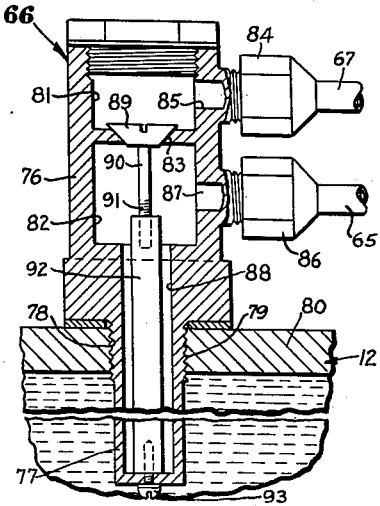
INVENTOR.
Harry J. McCombs Burdick.
BY
ATTORNEY.

Patented Nov. 2, 1937

2,097,548

UNITED STATES PATENT OFFICE 2,097,548

AUTOMATIC HUMIDIFIER

Harry J. McCombs Burdick, Anaheim, Calif.

Application September 3, 1935, Serial No. 38,958

4 Claims. (Cl. 123—25)

This invention relates to improvement in humidifiers for internal combustion engines.

The general object of my invention is to provide a novel means for mixing water vapor with the fuel of an internal combustion engine.

Another object of the invention is to provide an automatic humidifier for internal combustion engines wherein the amount of water vapor mixed with the fuel is controlled by the speed of the engine with which it is associated.

Other objects and the advantages of my invention will be apparent from the following description taken in connection with the accompanying drawing wherein:

Fig. 1 is a fragmentary side view of an automobile with portions thereof broken away and showing my improved humidifier operatively installed in association with the engine of the automobile;

Fig. 2 is an enlarged section through my improved humidifier;

Fig. 3 is an enlarged fragmentary section of the humidifier showing details of the water control valve;

Fig. 4 is an enlarged view partly in section of the water injector, and

Fig. 5 is an enlarged section through the thermostatically controlled valve.

Referring to the drawing by reference characters I have indicated an automobile generally at 10. The automobile 10 includes the usual internal combustion engine 12 having a fuel intake manifold 13 which conveys fuel from a carburetor 14 to the engine.

Associated with the engine 12 I have shown my improved humidifier which I have indicated generally at 15. As shown the humidifier 15 includes a body portion 16 having a cylindrical recess 17 therein, the open end of which is closed by a screw cap 18. At the end of the recess 17 opposite the cap 18 the body 16 is suitably apertured as at 19 to receive a packing gland 20.

Adjacent the cap 18 the body 16 has a threaded recess 21 therein in which a tubing coupler member 22 is positioned and adjacent the opposite end of the recess 17 the body has a threaded recess 23 therein in which a threaded stem of an air filter device 24 is positioned. Adjacent the coupler 22 the body 16 has an aperture 25 therein, one end of which communicates with the threaded recess 21 and the opposite end with the recess 17. Adjacent the opposite end of the recess 17 the body has an aperture 26 therein, one end of which communicates with the threaded recess 23 and the opposite end with the recess 17.

Below the recess 17 and on the same end of the body 16 as the cap 18 the body has a recess 27 therein which includes a threaded portion 28 adjacent its open end. At the end opposite the recess 27 and coaxial therewith the body 16 has a threaded recess 29 therein and intermediate the recesses 27 and 29 the body 16 has a reduced aperture 30 which is coaxial with the recesses 27 and 29 and at one end opens into the recess 27 and at the opposite end opens into the recess 29.

The recess 27 is closed by a threaded plug 31 which engages the recess threads 28 and the plug 31 is shown as locked in an adjusted position by lock nuts 32. At its inner end the plug 31 has a frusto-conical recess 33 therein and at the opposite end the plug 31 has a conical recess 34 therein and between the recesses 33 and 34 and communicating therewith the plug has a very small aperture 35 therein.

Over the outer end of the plug 31 I preferably provide screen member 36 which may be held in place by a band 36' and clamp nut 36".

The recess 29 is closed by a threaded plug 37 which has an aperture 38 therethrough. The plug 37 is shown as locked in an adjusted position by lock nuts 39.

Adjacent the threaded portion 28 of the recess 27 the body 16 has a threaded recess 40 therein in which is positioned a tubing coupler member 41 and adjacent the opposite end of the recess 27 the body 16 has a threaded recess 42 therein in which is positioned a tubing coupler member 43. Adjacent the plug 31 the body 16 has a reduced aperture 44 therein one end of which communicates with the threaded recess 40 and the opposite end with the recess 27. Adjacent the opposite end of the recess 27 the body 16 has a reduced aperture 45 therein one end of which communicates with the threaded recess 42 and the opposite end with the recess 27.

Positioned in the recess 17 I provide a piston member 46 and between the piston 46 and the cap 18 I provide a coiled spring 47 which resiliently urges the piston toward the end of the recess 17 remote from the cap 18. The piston 46 includes a stem portion 48 which extends out of the recess 17 through the aperture 19 and the packing gland 20. Adjacent its outer end the stem 48 is loosely connected by a link 49 to a lever bar 50. Above the stem 48 the lever 50 is pivotally secured as at 51 to a bracket 52 shown as integral with the body 16.

Positioned in the recess 27 I provide a valve member 53 which includes a piston portion 54 and a frusto-conical portion 55 which terminates in a flat end face 56. The valve 53 further includes a short reduced hub portion 57 which is positioned in the aperture 30 and a reduced stem portion 58 which is positioned in the aperture 38 of the plug 37. The outer end of the stem 58 is loosely connected by a link 59 to the lever 50. Surrounding the stem 58 between the hub 57 and the plug 39 I provide a coiled spring 60 which resiliently urges the valve 53 towards the plug 31.

The piston and conical portions of the valve 53 have an aperture 61 therein which extends from the end 56 to the opposite side of the piston portion 54. The aperture 61 opens through the end 56 on one side of the axis of the valve so that when the end 56 of the valve engages the bottom of the recess 33 of the plug 31 the apertures 35 and 61 do not communicate. (See Fig. 3.)

When the humidifier 15 is operatively installed in association with an engine, such as the engine 12 as shown in Fig. 1, the coupler member 22 is connected by a tube 62 to an injector member 63 and the coupler member 41 is likewise connected to the injector 63 by a tube 64. The coupler member 43 is connected by a tube 65 to a thermo control valve 66 and the thermo valve is in turn connected by a tube 67 to a water reservoir 68.

As shown in Fig. 4 the injector member 63 is in the form of a T fitting with the ends of the cross bar portion 69 having tubing coupler members 70 thereon for securing the tubes 62 and 64 thereto. The end of the stem portion 71 of the injector is closed by a conical end portion 72 which has a plurality of small apertures 73 therein. The stem portion 71 further includes an externally threaded portion 74 which engages the threads of a threaded aperture 75 provided in the intake manifold 13 of the engine 12.

As shown in Fig. 5 the thermo control valve 66 includes a body portion 76 having a reduced stem portion 77 extending therefrom which includes a threaded portion 78. This threaded portion 78 engages the threads of an aperture 79 provided in the water jacket 80 of the engine 12. Adjacent its upper end the body 76 has a chamber 81 therein and below the chamber 81 the body has a chamber 82 therein. Between the chambers 81 and 82 the body has a downwardly tapered reduced aperture 83 therein which forms a valve seat and at one end opens into the chamber 81 and at the opposite end opens into the chamber 82. The body 76 has a tube coupler member 84 suitably secured thereto which connects the tube 67 to the body and adjacent the coupler 84 the body 76 has an aperture 85 therein which communicates with the coupler 84 and with the chamber 81.

Furthermore, the body 76 has a tube coupler member 86 suitably secured thereto which connects the tube 65 to the body and adjacent the coupler 86 the body 76 has an aperture 87 therein which communicates with the coupler 86 and with the chamber 82. The body 76 and the stem portion 77 thereof have a recess 88 therein which opens into the chamber 82.

Positioned in the chamber 82 I provide a tapered valve head 89 which is adapted to engage the valve seat 83 to restrict passageway from the chamber 81 to the chamber 82. The valve head 89 has a reduced stem portion 90 which is suitably secured as by threads 91 to a thermo responsive rod 92. The rod 92 is made of suitable thermo responsive material and when heated becomes elongated. The rod 92 is positioned in the recess 88 and is secured to the lower end of the stem 77 by a screw 93.

When the engine is not operating and is cold the thermo rod 92 retains the valve 89 in tight engagement with the valve seat 83 and prevents flow of water from the chamber 81 to the chamber 82. Furthermore, when the engine is not operating the spring 47 of the humidifier 15 forces the piston 46 towards the lever 50 thereby swinging the lever outward which in turn moves the valve 53 with it until the piston portion 54 engages the end of the recess 27.

When the valve 53 is in this position the piston portion 54 thereof closes the inner end of the aperture 45 thereby preventing water from entering the recess 27. When the engine is started, as is well known a partial vacuum is created in the fuel intake manifold and it is furthermore well known that when the engine is idling the degree of vacuum is increased in the intake manifold due to the throttle valve being completely or nearly closed and that when the engine is operating at a high speed a lower degree of vacuum is produced in the intake manifold due to the throttle valve being more fully open.

When the engine is started and is idling a partial vacuum is formed in the tubes 62 and 64. The vacuum in the tube 62 produces a partial vacuum in the recess 17 between the piston 46 and the cap 18 which causes the piston to move towards the cap 18. As the piston 46 thus moves it swings the lever 50 towards the body 16 thereby moving the end 56 of the valve 53 into tight engagement with the bottom of the recess 33 of the plug 31 as shown in Fig. 3. When the valve 53 is in this position both the valve aperture 61 and the plug aperture 35 are closed thus preventing air entering the recess 27 and any water in the recess 27 between the piston portion 54 and the bottom of the recess 27 from being drawn into the tube 64 through the aperture 44.

When the engine has warmed to a predetermined degree the thermo rod 92 moves the valve 89 out of engagement with the valve seat 83 whereupon water is free to flow from the tank 68 through the tube 67 into the chamber 81 and thence through the valve seat aperture 83 into the chamber 82 and then through the tube 65 into the humidifier chamber 27 between the bottom thereof and the piston portion 54 of the valve 53.

When the engine throttle valve is opened to speed up the engine less vacuum is produced in the recess 17 of the device 15 whereupon the spring 47 moves the piston towards the bottom of the recess 17. As the piston thus moves it swings the lever 50 outward which in turn moves the valve 53 away from the plug 31 whereupon the partial vacuum in the tube 64 draws air into the chamber 27 through the aperture 35 and at the same time draws water through the valve aperture 61. As the water passes out of the aperture 61 it meets the incoming air from the aperture 35 and is partly vaporized. This vapor is then drawn through the tube 64 into the injector device 63 and passes out therefrom through the apertures 73 into the intake manifold 13 and mixes with the engine fuel.

So long as the engine is operating beyond idling speed and is warmed to a predetermined degree the valve 53 is retained in a position substantially as shown in Fig. 2 to allow water vapor to enter the fuel intake manifold. When the engine speed drops to idling speed the valve 53 is moved as previously described to the position shown in Fig. 3 to restrict the flow of water vapor to the fuel intake manifold and when the engine ceases to operate entirely the valve 53 is moved to a position wherein the piston portion 54 thereof restricts the entrance of water through the aperture 45 into the recess 27 and the rear end of the aperture 61 is closed against the rear wall of the recess 27 as previously described.

After the engine ceases to operate and cools to a predetermined degree the thermo rod 92 moves the valve 89 into tight engagement with its associated valve seat 83 and again prevents the flow of water from the chamber 81 to the chamber 82.

Having thus described my invention I claim:

1. In a humidifier adapted to be controlled by the degree of vacuum produced in the intake system of an engine, a body, said body including an air inlet, a water inlet and a humidified air outlet, a vacuum controlled valve, said valve having three operative positions, said valve in one position closing said air inlet and said humidified air outlet while leaving the water inlet open and in another position closing said water inlet, while leaving said air inlet and humidified air outlet open and when in an intermediate position allowing passage through both of said inlets and said outlet.

2. In a humidifier, a body having a chamber therein, said body having an aperture providing an air inlet, a valve in said chamber, fluid operated means to move said valve, said chamber having a water inlet at one end, said chamber having an outlet at the other end, said body having a frusto-conical recess therein communicating with said air inlet, said valve having a cylindrical body and a frusto-conical head conforming in shape to the recess in said plug, the end of said valve being plane and serving to close said air inlet when the valve is in one extreme position, the cylindrical portion of said valve serving to close said water inlet when the valve is in the other extreme position, said valve having an aperture extending therethrough, said aperture at one end being disposed at one side of said plane portion, said aperture at the other end terminating at the other end of the valve.

3. In a humidifier, a body having a chamber therein, said chamber having an inlet adapted to communicate with an intake manifold, a piston in said chamber, said body having a second chamber therein, said second chamber being disposed at one side of said first chamber, said body having an air inlet aperture therein opening into one end of said second chamber, a valve member in said second chamber, lever means connecting said piston and valve whereby movement of said piston moves said valve, a water supply conduit having an outlet opening into one end of said second chamber, an outlet conduit extending from the other end of said second chamber and adapted to communicate with an intake manifold, said valve having an end portion adapted in one extreme position to close said air inlet aperture, said valve body in another extreme position overlapping said water conduit outlet, said valve in all portions being free from said outlet conduit.

4. In a humidifier, a body having a pair of chambers therein, each of said chambers being closed at one end and open at the other end, a piston in one of said chambers, said piston including a piston rod, a spring normally urging said piston in one direction, said one chamber having an inlet, said other chamber having a plug in the open end thereof, said plug having an aperture providing an air inlet, a bore extending from said other chamber, a valve in said other chamber, said valve having a stem slidable in said bore, a lever pivoted on said body, said piston rod and said stem being pivoted to said lever, said other chamber having a water inlet at the end remote from said plug, said other chamber having an outlet adjacent the plug, said water inlet and said outlet being in the side wall of said other chamber, said plug having a frusto-conical recess therein communicating with said air inlet, said valve having a cylindrical body and a frusto-conical head conforming in shape to the recess in said plug, the end of said valve being plane and serving to close said air inlet when the valve is in one extreme position, the cylindrical portion of said valve serving to close said side wall inlet when the valve is in the other extreme position, said valve having an aperture extending therethrough, said aperture at one end being disposed at one side of said plane portion, said aperture at the other end terminating adjacent the stem, a relatively heavy spring urging said piston in one direction and a relatively light spring urging said valve towards its seat.

HARRY J. McCOMBS BURDICK.